United States Patent
Ghavami et al.

(10) Patent No.: US 11,849,184 B2
(45) Date of Patent: Dec. 19, 2023

(54) SYSTEM FOR DYNAMIC MULTIMEDIA ANALYSIS, MATCHING AND DECISION-MAKING

(71) Applicant: Spotible Labs LLC, New York, NY (US)

(72) Inventors: Dana Ghavami, New York, NY (US); Chen Levy, New York, NY (US); Vincent R Sanchez, New York, NY (US)

(73) Assignee: Spotible Labs LLC, New York, NY (US)

( * ) Notice: Subject to any disclaimer, the term of this patent is extended or adjusted under 35 U.S.C. 154(b) by 0 days.

(21) Appl. No.: 17/391,940

(22) Filed: Aug. 2, 2021

(65) Prior Publication Data

US 2022/0038776 A1    Feb. 3, 2022

Related U.S. Application Data

(60) Provisional application No. 63/059,484, filed on Jul. 31, 2020.

(51) Int. Cl.
*H04N 21/458* (2011.01)
*H04N 21/44* (2011.01)
(Continued)

(52) U.S. Cl.
CPC ....... *H04N 21/458* (2013.01); *G06Q 30/0242* (2013.01); *G06V 20/41* (2022.01); *G06V 20/46* (2022.01); *H04N 21/2353* (2013.01); *H04N 21/23424* (2013.01); *H04N 21/26233* (2013.01); *H04N 21/4316* (2013.01); *H04N 21/44008* (2013.01); *H04N 21/44218* (2013.01)

(58) Field of Classification Search
CPC .......... H04N 21/458; H04N 21/23424; H04N 21/2353; H04N 21/26233; H04N 21/4316; H04N 21/44008; H04N 21/44218; G06V 20/46; G06V 20/41; G06Q 30/0242
See application file for complete search history.

(56) References Cited

U.S. PATENT DOCUMENTS

| | | | |
|---|---|---|---|
| 10,395,642 B1 * | 8/2019 | Clasen | H04N 21/8547 |
| 11,068,926 B2 * | 7/2021 | Ken-Dror | G06F 16/3326 |

(Continued)

*Primary Examiner* — Sumaiya A Chowdhury
(74) *Attorney, Agent, or Firm* — McCarter & English, LLP; James M. Smedley; Alex Korona

(57) ABSTRACT

A system and method to dynamically analyze digital media and select multimedia assets or items to render with correlated IP-connected media and apps. Hierarchical Taxonomy, Engagement-based and Neural-based asset matching is rendered with rule-based and Diminishing Perspective decision-making. A user can listen, view and interact with the correlated and rendered material using an input device native to the computing device being used to access the IP-connected media. Embodiments extract features from the digital media. The extracted features are semantically analyzed for an understanding of characteristics associated with the respective features. Topics are extracted from the digital media based on the characteristics. Stored assets are correlated to the extracted topics to select an asset based on characteristics of the extracted topics correlating with the selected asset. The selected asset is rendered with the digital media.

20 Claims, 11 Drawing Sheets

(51) Int. Cl.

| | |
|---|---|
| *H04N 21/442* | (2011.01) |
| *G06V 20/40* | (2022.01) |
| *G06Q 30/0242* | (2023.01) |
| *H04N 21/234* | (2011.01) |
| *H04N 21/235* | (2011.01) |
| *H04N 21/262* | (2011.01) |
| *H04N 21/431* | (2011.01) |

(56) References Cited

U.S. PATENT DOCUMENTS

| | | | | |
|---|---|---|---|---|
| 2012/0254917 | A1* | 10/2012 | Burkitt | G06F 16/9535 |
| | | | | 725/40 |
| 2013/0159110 | A1* | 6/2013 | Rajaram | G06Q 50/01 |
| | | | | 705/14.66 |
| 2015/0339468 | A1* | 11/2015 | Son | G06F 3/013 |
| | | | | 726/19 |
| 2017/0083599 | A1* | 3/2017 | Bostick | G06F 16/955 |
| 2020/0057821 | A1* | 2/2020 | Tagra | G06V 20/70 |

\* cited by examiner

*Spottible classifier pairs observed on a specific publisher, and their effect on user engagement rate*

FIG. 7

$$\begin{bmatrix} Pizza \\ Topping \\ Pineapple \\ Hawaii \end{bmatrix} \times \begin{bmatrix} Fizzy\ Beverage \\ Energy \\ Iceland \end{bmatrix} = \begin{bmatrix} Pizza & Fizzy\ Beverage & 0.005 \\ Pizza & Energy & 0.001 \\ Pizza & Iceland & 0.001 \\ Topping & Fizzy\ Beverage & 0.000 \\ Topping & Energy & 0.000 \\ Topping & Iceland & 0.001 \\ Pineapple & Fizzy\ Beverage & 0.002 \\ \vdots & \vdots & \vdots \\ Hawaii & Iceland & 0.003 \end{bmatrix}$$

FIG. 8

SYSTEM FOR DYNAMIC MULTIMEDIA ANALYSIS, MATCHING AND DECISION-MAKING

CROSS-REFERENCE TO RELATED APPLICATIONS

This application claims benefit under 35 U.S.C. § 119(e) of U.S. Provisional Patent Application No. 63/059,484, filed Jul. 31, 2020, which is hereby incorporated by reference herein in its entirety.

FIELD OF THE INVENTION

The present invention relates generally to computer-based methods and apparatuses, including computer program products, for a system and method of dynamic multimedia analysis, matching and decision-making.

BACKGROUND OF THE DISCLOSURE

Contextual targeting is reducing the reliance on personal information for promotional message targeting, due to growing consumer privacy concerns, General Data Protection Regulation (GDPR), the California Consumer Privacy Act (CCPA) and increasing data privacy regulations.

Matching promotions based on page context is a compelling targeting strategy by ensuring relevancy without the need to leverage third-party data. Even though an individual's data is anonymized, contextual signals can give you an insight into a consumer's frame of mind and receptiveness to a particular message, at a particular moment. However, context-based targeting is not without its challenges. The need to ensure brand safety is paramount, and semantically understanding content in an automated and scalable way presents a host of complications and requires a high degree of sophistication to realize its benefits across multimedia asset types (including audio, video, imagery, text and HTML).

Relevancy based only on context and hierarchical taxonomies poses a limitation in performance without consideration of engagement rate and other rule-based criteria.

The exemplary disclosed system and method of the present disclosure is directed to overcoming one or more of the shortcomings set forth above and/or other deficiencies in existing technology.

BRIEF DESCRIPTION OF THE DRAWINGS

FIG. 7 is a plot of classifier pairs compared to user engagement in accordance with embodiments.

FIG. 8 is a diagrammatic view of engagement-based scoring in accordance with embodiments.

SUMMARY OF THE INVENTION

In one aspect of the subject disclosure, a method for dynamic correlation of assets with text or image based digital media is disclosed. The method is performed by a computer processor. The method includes extracting features from the digital media. The extracted features are semantically analyzed for an understanding of characteristics associated with the respective features. Topics are extracted from the digital media based on the characteristics. Stored assets are correlated to the extracted topics. An asset is selected from the stored assets, based on characteristics of the extracted topics from the digital media correlating with a topic of the selected asset. In addition, the selected asset is rendered with the digital media.

In another aspect, a method for dynamically correlating assets with digital media is disclosed. The method is performed by a computer processor. The method includes identifying an audio/video digital stream of information or data. The audio/video digital stream is segmented into sections of digital media data. Features are extracted from respective sections of the digital media data. Topics are identified for each section of digital media from the extracted features. Stored assets are corelated to the identified topics. An asset is selected for each section of the digital media from the stored assets based on the identified topics for each section of the digital media. The selected asset is rendered with respective sections of the digital media.

In yet another aspect, a computer program product for dynamic correlation of assets with digital media is disclosed. The computer program product comprises one or more computer readable storage media, and program instructions collectively stored on the one or more computer readable storage media. The program instructions include extracting features from the digital media. The extracted features are semantically analyzed for an understanding of characteristics associated with the respective features. Topics are extracted from the digital media based on the characteristics. Stored assets are correlated to the extracted topics. An asset is selected from the stored assets based on characteristics of the extracted topics from the digital media correlating with a topic of the selected asset. The selected asset is rendered with the digital media.

The techniques described herein may be implemented in a number of ways. Example implementations are provided below with reference to the following figures.

DETAILED SPECIFICATION

The subject technology generally relates to dynamically correlating text and multimedia data with associated assets. Specifically, embodiments relate to a unique way of dynamically associating assets with web-based (IP-connected) text/HTML, images and audio/video multimedia streams.

Figure 3:
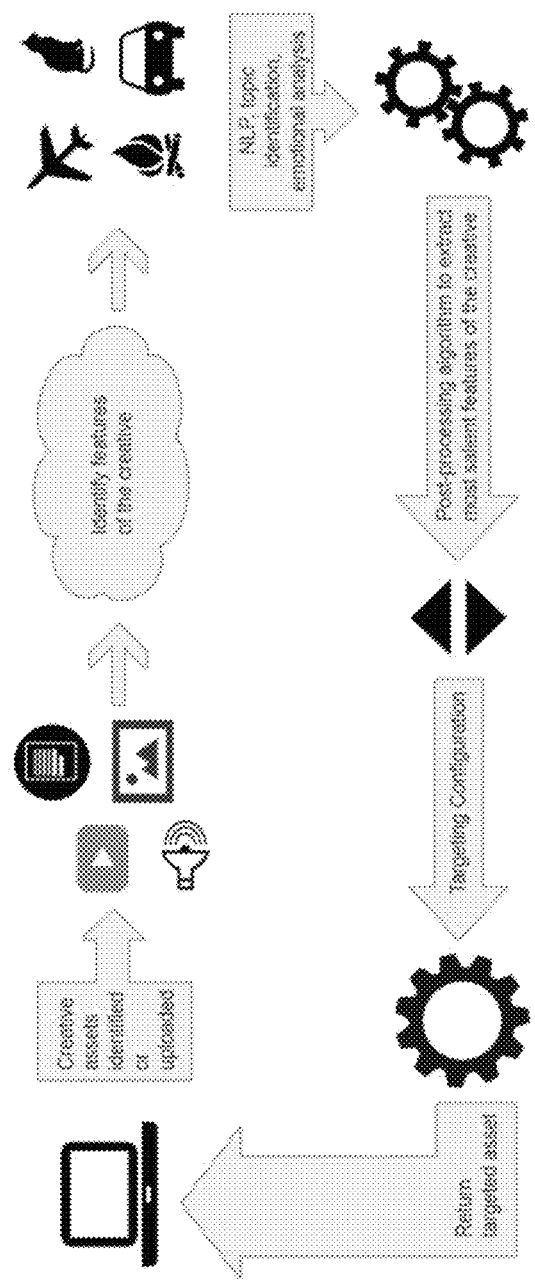
FIG. 3 is a schematic diagram illustrating a method for dynamic semantic targeting of multimedia content.

Referring generally to FIG. 3, in one embodiment, the system and method conduct real-time analysis and transcription of text/image, podcast/audio, or video content in order to classify the content and construct relevant topics/themes. The topics and themes are then matched to context of app content being accessed by a user and the system/method provides suggested listening or watching of a relevant podcast (or video) and/or other types of promotions (an object used to promote, for example, an ad), messaging or content. For example, as a user reads an article about the stock market, the system can suggest a podcast episode discussing topics related to the article content, such as the current risk of recession.

Classification of text, image, audio, or video occurs in a multi-step process, mainly:
  Identification of features, including entities, people, places and logos—filtered based on confidence levels meeting a specific threshold.
  Moreover, further analysis is required to obtain a semantic understanding of the asset beyond "what" is in it, using several processes, including:
    Natural language processing (NLP) to identify lexical relationships between the features of the asset and the identification of broader, connotative topics included in the content.
    Additionally, emotional and sentiment analysis of the asset.

According to another embodiment, the system provides a control panel to configure the targeting mechanism according to more traditional features, for example targeting to devices, browsers, platforms, operating systems and/or geo-location. In addition, the system classifies the app using a similar process as outlined for asset analysis but tailored for app pages (using structure weighting to identify important text, for example), or in a video content environment, respective meta data. The communication vis-a-vis app content/classification and the system can be performed using real-time bidding (RTB) methods or via key pair values (KPVs) passed from a third party contextual analysis or similar service. Asset matches can be made to the page in a modular manner across multiple contextual analysis services utilized on either end point (the app content or the asset) through adherence with Content Taxonomy as defined by the Interactive Advertising Bureau (IAB) for the advertising ecosystem or any other purpose-specific information taxonomy for any industry, providing a robust and interoperable decision engine to enhance information display, and the system itself, through for example best of breed computer vision or NLP algorithms, and matching to any content environment which may be using its own or different contextual analysis services so that the subject system/method is not limited to any one proprietary form of analysis. Further, real-time communication protocols can bid the match confidence of an asset to content and weigh based on the matching score of contextual relevancy versus price. In an embodiment of the subject technology with use case in digital advertising, RTB of digital inventory/ad space is currently performed only from the standpoint of price or how much a marketer is willing to pay for the digital ad space, instead of by intent for the space by way of relevancy to serve companion content or other forms of messages/promotions, not based on price, but based on value for the reader with prospective profit for the publisher in the form of additional subscribers or downloads/audience reach for example of pod/audio content (e.g., different unit values other than price an entity is willing to pay for the impression).

Once the set of assets and their classifiers, as well as the content and its classifiers are obtained, the matching process is performed. In the system, rules for classifier matching can be specified, such as classifiers to target away from, or preferred combinations of classifiers to prioritize, which is paramount to brand safety and relevancy. In one embodiment, for an example use case of digital advertising, an entity might want to target a video advertising a vacation package toward content about the Caribbean, except in cases where the subject matter is about hurricanes. Promotions due for exclusion are filtered out, and from the set of remaining contenders (which may be weighted based on the degree of match or manual configuration) the system selects a matching creative asset according to relative weights in a statistical manner, ensuring the best matching asset is most likely to be served. The matching asset is returned to be rendered in the requesting app. In some embodiments, the matching asset may be rendered according to a specified creative format and placement. The system also avoids creative starvation, and temporarily boosts delivery of inventory which has fallen behind schedule due to targeting constraints.

Audio content/podcasts (or video) which consist of episodes of significant length and range of topics are analyzed and targeted in micro-segments with relevancy to what is being listened to or viewed in real-time based on relevant/audio (or video) content, categories, topics, etc. For example, the fourth through eighth minute of a podcast (or video) which discusses the topic of geopolitics of trade can be provided to a viewer to listen (or watch) while reading, listening or viewing related content in current global trade.

Through micro-segmentation and targeting, audio (and video) producers can for the first time identify and determine actual segments or types of content that drive the most interest/resonate the most with listeners (or watchers) in an episode by evaluation of the number of key performance indicators (KPIs) which result from a micro-segment, such as the number of times out of total listeners (or viewers) that unmuted the audio (or video) to listen (or watch) due to a certain segment/topic or downloaded or subscribed to the audio/podcast (or video channel) as a result of the micro-segment. In essence, micro-segmentation KPIs serve as live polling of the most appealing content to an audience similar to how viewers can respond to what they like/dislike during a live debate to evaluate a live trend of which positions by the debaters were most liked by the audience.

In another embodiment, a method is provided to track downloads, subscribes and attribution of future engagement/downloads from a subscription based on manipulation of the RSS to redirect the end point/landing page to the podcast (or video) hosting service through the system for measurement of the lifetime value of a listener (or viewer) gained through discovery.

Analysis of content can further result in the promotion of the content/segment through use of classifiers as meta data for ranking, for example queries on a search engine. The analysis of asset information in text, image or multimedia form may also result in the matching and decision to display, or prioritize for display by a third party server through RTB, KPVs, or packaging of information for weighting/selecting, relevant information about a person, entity, place or context in the app at any point in time. In one example embodiment, statistics about the career of an actor or athlete identified in an app or streaming content, are matched/mapped with purpose-specific taxonomy of asset/statistic information. In another example embodiment, the information used to match/select a promotion and/or informational asset to app content can be displayed to the content viewer in the form of the main topics or statistics matched to the content in real-time for a greater sense of interest and/or relevancy substantiation to the viewer. For example, displaying exactly which topics classified and matched in an audio (or video) asset were found to be relevant.

With respect to text/image, audio, or video content, the system may be further configured to perform real-time analysis of audio (or video) content/transcription to classify and construct topics/themes and correspond assets or content directed to suggested audio (or video) content, such as a relevant podcast or show, based on context of the app.

Additionally, the classification process can be performed according to IAB Content Taxonomy specification, providing a basis of taxonomy and commonality with contextual analysis performed by other systems, as may be used by the media entity. Additional analysis may be performed of the asset's emotional effect, in case of video, determining what viewers feel while watching (e.g., "excitement" for a luxury car commercial, or "success" for a movie trailer about the rise of an artist's career). In the event of a marketer with a diverse product set/offerings and/or assets, for example an auto manufacturer of SUVs and Minivans, the most relevant message and/or creative display, audio or video asset can automatically be selected and displayed to the consumer based on contextual or emotional context, whereby the off-road SUV commercial will be displayed adjacent to adventure oriented context and/or curiosity and the Minivan commercial adjacent to family oriented context and/or compassion. The analysis provides a summary of the overall sentiment of the content—whether the emotions contained are generally positive, neutral, negative, or some combination thereof.

One of ordinary skill in the art will appreciate that the system of the present invention may also be configured to target assets/promotional messages/ads/content according to more traditional features, such as targeting to browsers, devices, platforms, operating systems, and/or geolocation.

In addition, the system may be configured to classify app content using a similar process as outlined for asset analysis but tailored for web pages (using HTML structure weighting to identify important text, for example) or multimedia streams (using respective metadata).

Figure 1:
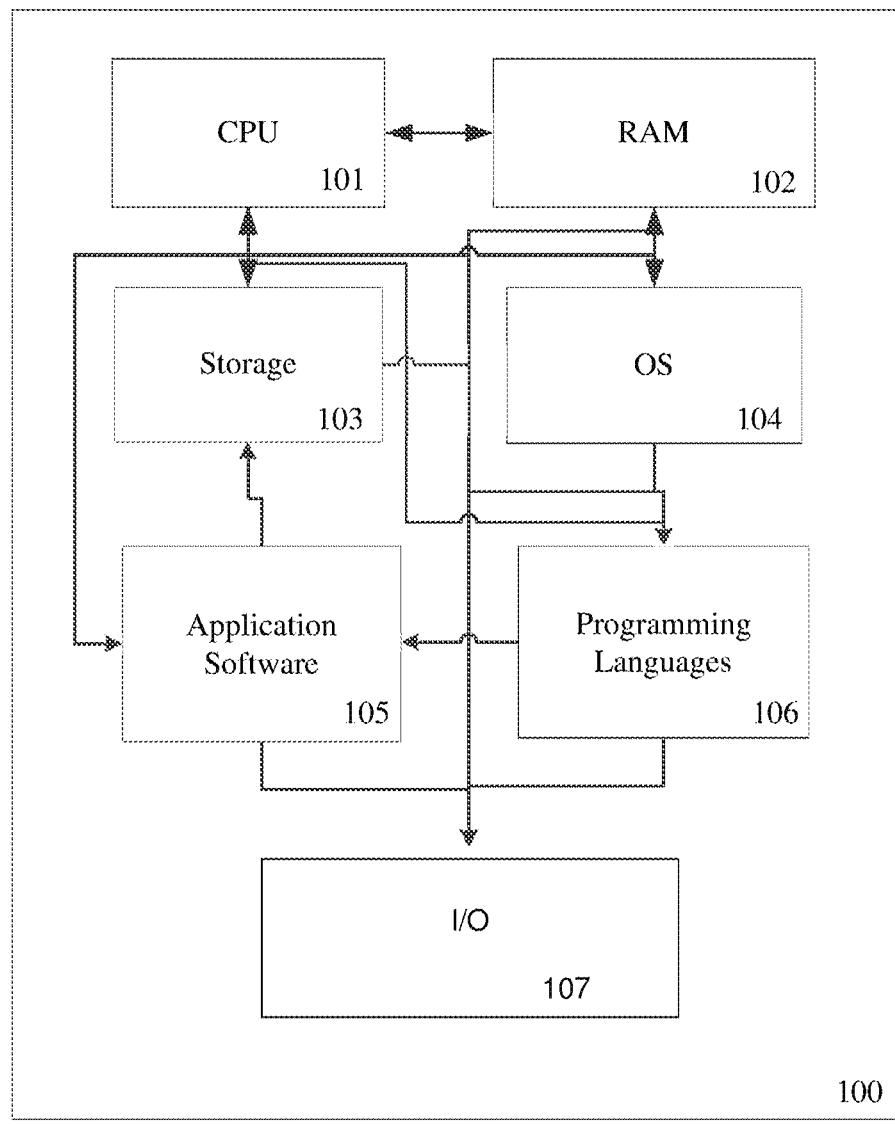
FIG. 1 illustrates a schematic overview of a computing device, in accordance with an embodiment of the present invention.

Referring now to FIG. 1, a computing device 100 appropriate for use with embodiments of the present application is shown according to an exemplary embodiment. The computing device 100 may generally be comprised of one or more of a Central Processing Unit (CPU) 101, Random Access Memory (RAM) 102, and a storage medium (e.g., hard disk drive, solid state drive, flash memory) 103. Examples of computing devices usable with embodiments of the present invention include, but are not limited to, personal computers, laptops, tablet PCs, smartphones, mobile computing devices, connected TVs (CTVs), gaming consoles, smart speakers, augmented reality (AR) or virtual reality (VR) headsets/displays and servers. The term computing device may also describe two or more computing devices communicatively linked in a manner as to distribute and share one or more assets, such as clustered computing devices and server banks/farms. One of ordinary skill in the art would understand that any number of computing devices could be used, and embodiments of the present invention are contemplated for use with any computing device.

In an exemplary embodiment, data may be provided to the system, stored by the system and provided by the system to users of the system across local area networks (LANs) (e.g., office networks, home networks) or wide area networks (WANs) (e.g., the Internet) with protection of personal identifiable information. In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment, some of the applications of the present invention may not be accessible when not connected to a network, however a user may be able to compose data offline that will be consumed by the system when the user is later connected to a network.

Figure 2:
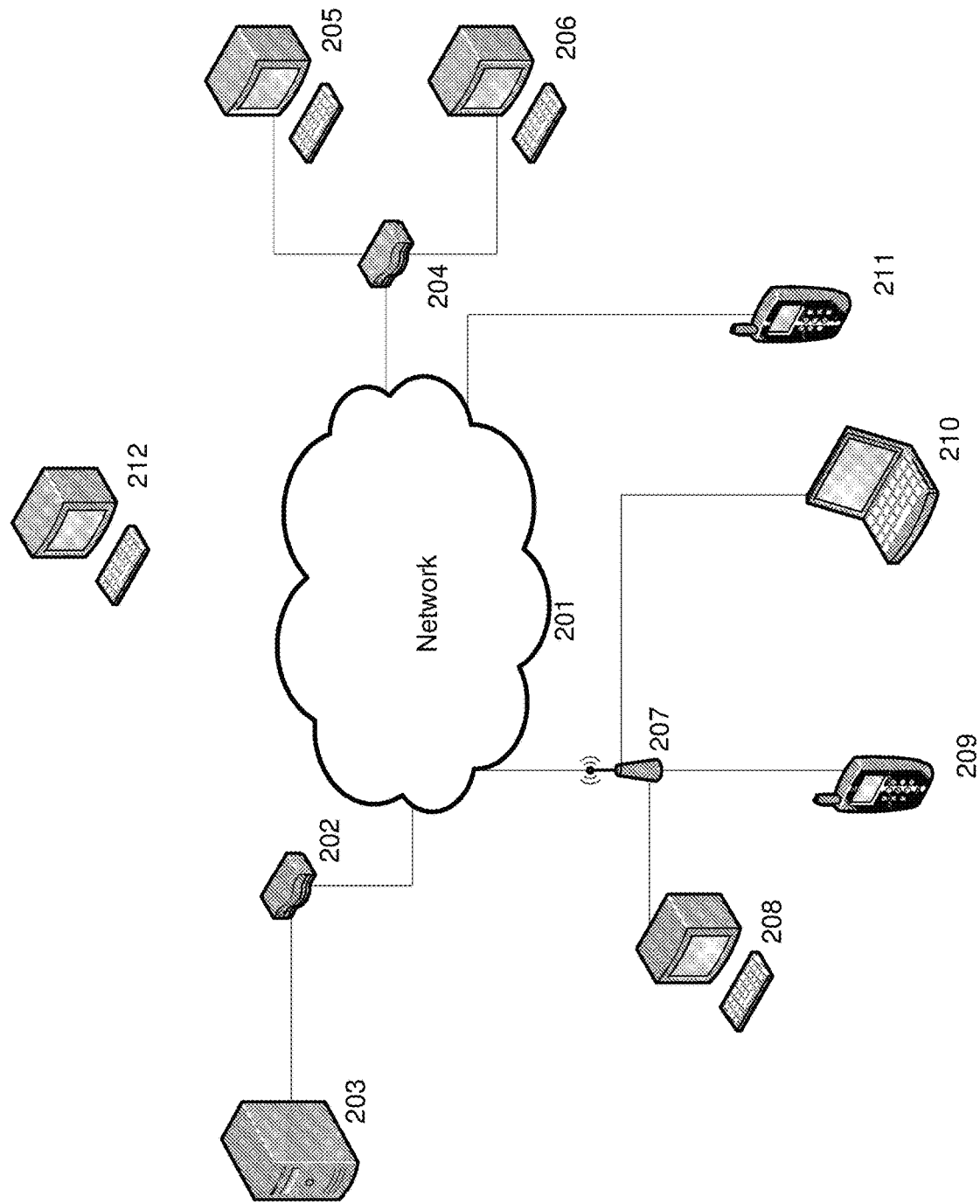
FIG. 2 illustrates a network schematic of a system, in accordance with an embodiment of the present invention.

Referring now to FIG. 2, a schematic overview of a system in accordance with an exemplary embodiment is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 2, exchange of information through the WAN 201 or other network may occur through one or more high speed connections.

In some cases, high speed connections may be over-the-air (OTA), passed through networked systems, directly connected to one or more WANs 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to WAN 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via WAN 201 or other network in numerous ways. For instance, a component may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art would appreciate that there are numerous ways that a component may connect to server 203 via WAN 201 or other network, and embodiments of the present invention are contemplated for use with any method for connecting to server 203 via WAN 201 or other network. Furthermore, server 203 could be comprised of a personal computing device, such as a smartphone, acting as a host for other computing devices to connect to.

Embodiments provide methods and systems for dynamically correlating and selecting assets with IP-connected media, specific examples of which are apps, smart speakers, over-the-top (OTT) content streaming services, and more traditional web-based content (static and multimedia). In an exemplary application, the results of correlation generate an automatic integration of an asset into (or proximate a display of) the IP-connected media. For purposes of this invention, one skilled in the art will recognize that "assets" can include any type of media or electronic content including static or dynamic text, static or dynamic graphical images of any type, including animated images, web content such as HTML and XML code, other code, RSS or other feeds, data such as social media content or other data sources, video and/or sounds or other audio content including, for example, speech and music whether streamed or downloaded. In addition, assets as used herein include any combination of media types, and may be compressed or raw. In some embodiments, an asset under the subject technology may be adapted for use as an advertisement.

An asset and/or content client manages correlating assets with the app. Upon initialization, the asset client connects to a multimedia server (for example, server 203 of FIG. 2), and establishes a second communication channel into the app. The multimedia server maintains a collection or a list of dynamically modifiable assets for correlation with the app.

Upon the asset client receiving an indication that an asset match is needed in the app, the asset client notifies the multimedia server to request an asset. The multimedia server, in turn, selects a particular asset from its collection according to a set of criteria, and sends that asset or an indication of that asset to the asset client. The asset client then provides the asset to the app, which renders the asset into the app by displaying it on the screen, playing a sound over speakers, or by some other method appropriate to the media. In an exemplary environment, the multimedia server begins correlating a set of advertisements to the ad asset client immediately after the second communication channel is established, where they are stored, for example, by the ad asset client until needed.

Embodiments of the present invention can be used with all types of apps, OTT streaming platforms such as Apple tvOS® or Amazon Fire TV®, voice/audio streaming platforms such as Apple Siri® or Amazon Alexa® smart speakers/products and/or services, and systems, software or hardware that can establish a communication channel with the multimedia server. The communication channel may be established with the app through, for example, an application program interface (API) or software development kit (SDK). Furthermore, the app may be running at any location on a standard personal computer or mobile device connected to a network (e.g., the Internet) through narrow or broadband, DSL, ISDN, ATM and Frame Relay, cable modem, optical fiber, satellite or other wireless network, etc. For purposes of this application the term "app" shall include any digital media or software application, including smart speakers, native apps, OTT platforms, websites, games, email clients, etc.

Although the subject technology is discussed below specifically with reference to apps, smart speakers and OTT platforms, one skilled in the art will appreciate that the techniques disclosed are useful in other contexts as well, such as dynamic insertion of ads and/or other content into any Internet connected device. Cost of use of such devices and/or access to pay-per-view content may be subsidized by advertisers paying for advertising directed to the devices. Also, the ads can be made much more effective to the recipient than standard advertising by using a system that can dynamically correlate the ads to the content being viewed or listened and can tailor (or personalize) them to the users of such content.

Asset Semantic Classification

Figure 4:
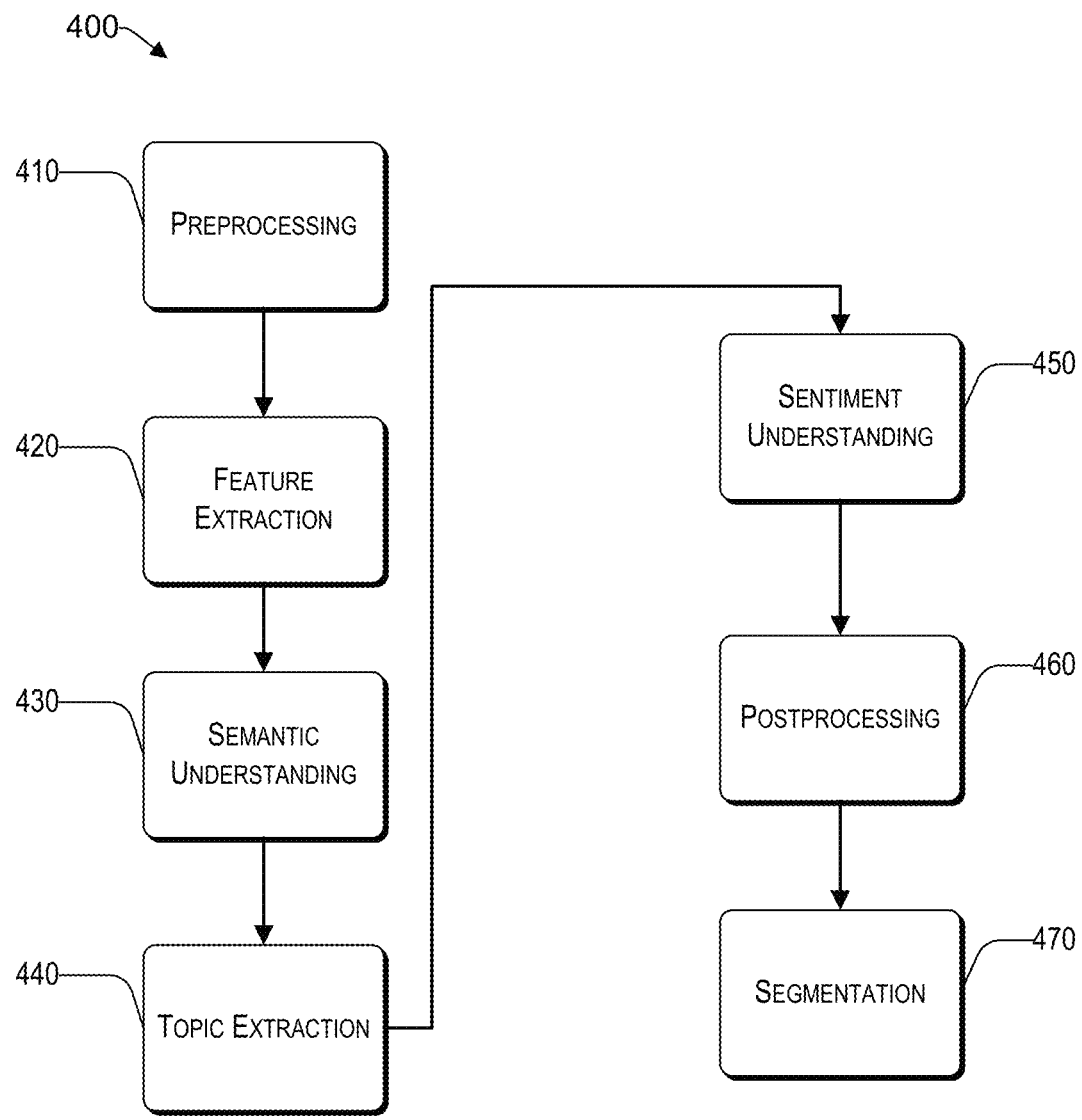
FIG. 4 is a flowchart of a method of dynamic multimedia asset analysis and segmentation in accordance with an exemplary embodiment.

Embodiments may include an emotive engine that makes sentiment targeting configuration an intuitive process. Once the assets for analysis are determined, they are classified according to their composition, whether they comprise of audio, video, image, text, HTML or a multimedia combination. "Assets" as used herein may refer to a digital media stream or file. Referring now to FIG. 4, a method 400 of autonomous analysis of assets is shown according to an exemplary embodiment.

In block 410, Preprocessing: the asset is disassembled into its core components. For example, a video asset will have its audio soundtrack extracted and formatted, and the video stream will be formatted and dissected to extract a set of images, which reliably represent the content at key moments throughout the video.

In block 420, Feature extraction: The preprocessed objects have their different features and properties identified and extracted, using proprietary algorithms and best of breed external services. Some of the identified features include entities, people, places and logos, which are then sorted based on confidence level and filtered to meet a specified threshold. These results alone, however, are not enough to obtain a semantic understanding of the creative, and so further analysis is required beyond determining "what" is in the asset.

In block 430, Semantic understanding: Once features of the assets are identified, several processes may be used to create a semantic understanding of the asset's contents. For example, Natural Language Processing (NLP) may be used for recognizing lexical relationships between the different features, recognizing broader connotative topics included in the content, and recognizing the emotion and sentiment of the message. Each sentence in the text, or transcript in the case of audio and video, is parsed and the syntactic role of each word is identified. A lemmatization process may be used to distinguish similar words which differ in their meaning based on their surrounding context, as well as for identifying different words that share a common fundamental definition—critical nuances that are lost when a semantic analysis only uses simple string matchings.

In block 440, Topic Extraction: General topics associated with the text are extracted, using a conceptual hierarchy, and weighted to determine their relative importance to the overall thematic arc of the message.

In block 450, Sentimental understanding: The asset's emotional effect on end viewers/listeners is extracted, to determine whether the emotions contained are generally positive, neutral, negative, or some combination thereof.

In block 460, Postprocessing: All the available information about the various features, entities and topics of the resource are sorted according to prominence, letting the most important features "rise to the top", while pushing down the utility of peripheral concepts. For example, an idea that repeats itself over the duration of the content, may be assigned greater relative importance than other concepts or entities which appear only once. The final list of concepts, known as "classifiers", is retained, and may be used during the real-time matching process.

In block 470, Segmentation: Long form media, such as audio and video, may go through an additional step where the media is segmented into small units, in some instances approximately a minute or two in length, based on understanding of the flow of the media, obtained in the steps above. For example, an audio asset will be segmented based on changes in the topics discussed or when a longer than usual silence is encountered. Each segment goes through the classification process to gain its own set of classifiers. This allows for more accurate matching as not only an asset, but a specific segment of the asset, can be semantically matched to the content environment. For example, if a page discusses the topic of a motorcycle quickshifter, the page can be matched to an audio asset dedicated to quickshifting, or to an asset that may discuss the latest advancements in motorcycle technology which contains a segment about quickshifting. If the latter asset is selected, in an audio player embodiment, playing from the relevant audio segment will commence in the content environment.

Page Semantic Classification

The content environment, which may take the form of a webpage, native app, OTT platform or smart speaker, may be classified in a similar manner as assets. In the case of a webpage, when the multimedia server receives a request for an asset, it will check whether the request contains page classifiers, as some entities have custom page classification mechanisms. If not, the server will check the page classification cache for a previous classification of the specific page, and if none exists, the system may classify and cache the page. This process has an additional preprocessing step compared to asset classification, where the structure of the page is examined to identify the primary content and disregard peripheral elements such as widgets of trending pages, related content, etc. Once the page has been classified, it can be matched to the competing assets.

Some webpages change periodically. For example, a homepage may change multiple times a day, as well as a section's main page, such as the sports section in an online publication. The subject technology system may sample pages periodically and learns of their tendency to change, whereby pages that change often will be reclassified frequently, whereas pages that rarely or never change will be sampled infrequently (or less frequently than a default sampling frequency).

Real-Time Matching

When the multimedia server receives a request for an asset, a real-time competition may be held between all targeted assets, to select the best match for the context. The competition pipeline contains multiple steps in accordance with each asset's targeting criteria, one of which is the matching step, where classifiers derived from the asset are matched to classifiers derived from the content environment. Embodiments may use three types of matching:

Hierarchical Taxonomy Matching:

This matching process premises that similarity between the topics of an asset and the context within which it is embedded, results in a higher engagement rate. For example, if the content environment discusses a certain topic, it is highly beneficial to place an asset presenting the same or similar topic, whereby content relevancy will draw the attention and action of the viewer or listener.

Figure 5:
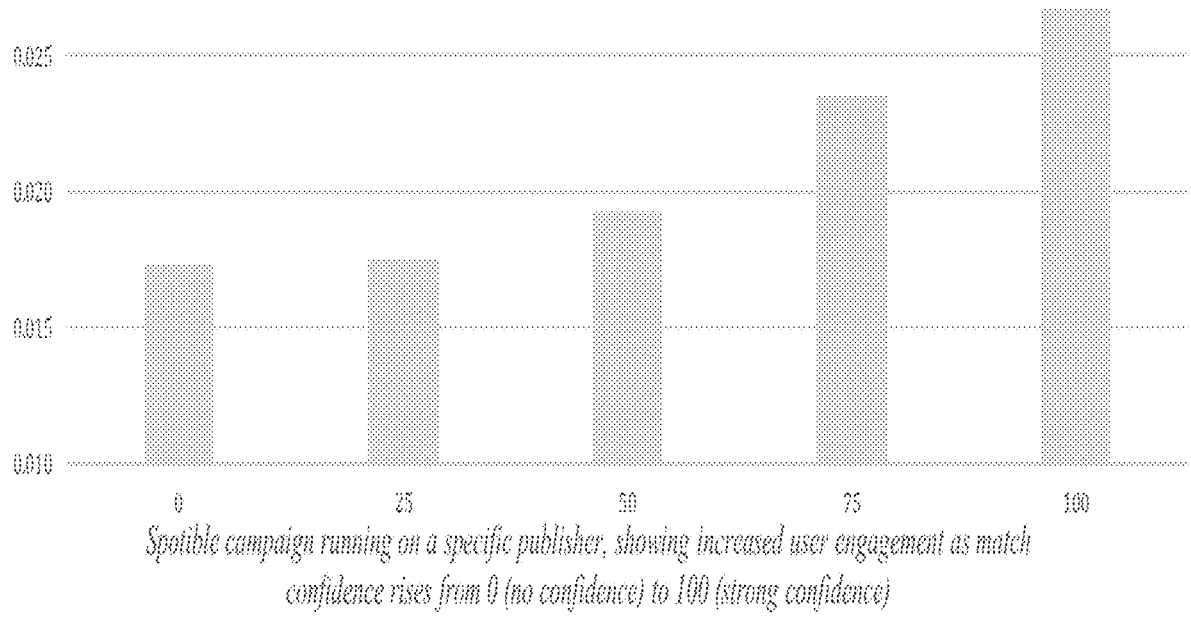
FIG. 5 is a plot showing the correlation between user engagement and match confidence in the delivery of promotional campaigns in accordance with embodiments.

Referring to FIG. 5, a plot of results from a contextual multimedia campaign running for several months and correlating from several dozen campaigns, demonstrates how when content environment and campaign have a high match confidence (strong correlation), user engagement increases significantly.

Figure 6:
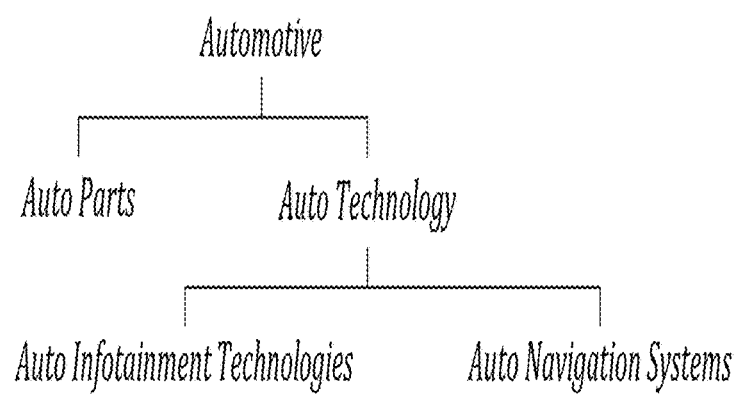
FIG. 6 is a diagrammatic view of a taxonomy scheme in accordance with embodiments.

In an embodiment using the IAB Content Taxonomy, the relationships between different topics help in measuring how relevant ad topics are to page topics. As such, the relationship between two topics that do not exactly match (string equality) can still be quantified based on their taxonomical similarity. For example, the IAB Content Taxonomy defines the relationship as shown in FIG. 6.

In this embodiment, on a page that discusses Auto Navigation Systems, the matching mechanism will give the highest score, and therefore a higher selection priority, to an asset that matches the exact topic of the context (Auto Navigation Systems). A promotion with a more general topic of Auto Technology or one of its other offspring, such as Auto Infotainment Technologies, will still be considered relevant but to a lesser extent and thus will receive a lower relevance score. A promotion with the topic Automotive, while still likely relevant, will get an even lower score.

The matching mechanism will measure the contextual relationships between all the context classifiers and all the asset's classifiers, resulting in a combined match score. That score will be used by the competition pipeline in selecting the most suitable asset.

For seamless integration, the emotive engine in the subject technology is designed to work with different taxonomies, for example purpose-specific professional sports leagues, industrial or informational taxonomies, such as IPTC Media Topics. By default, the IAB Content Taxonomy is utilized.

Engagement-Based Matching:

This matching process premises that topic combinations that led to an engagement in the past will also do so in the future. That is, the most beneficial relationship between two classifiers is not necessarily their linguistical proximity, but rather their tendency to lead to an engagement.

The system of the subject disclosure accumulates a vast amount of data that is examined to reveal topic relationships that are more common when users engage with promotional messages. For example, a content environment that discusses the validity of pineapple as a pizza topping may produce classifiers such as: Pizza, Fast Food, Pineapple, Hawaii, etc. A promotion for pineapple pizza is a good candidate for that content environment because it has similar classifiers. A promotion for a fizzy beverage is a lesser candidate, but still relevant as it is related to Fast Food. Usually, the most similar ad (pineapple pizza) will be selected, as it shares the most classifiers with the content. However, past data may demonstrate that selecting the fizzy beverage promotion is more beneficial because it has shown to draw more engagement in this content environment.

This matchmaking process foregoes the limited rules and relationships described in hierarchical taxonomies, enabling positive scoring of relationships between topics that were not previously considered. As shown in FIG. 7, most classifier pairs will have little to no effect on engagement rate, whereas some will have a positive or negative effect.

The scoring mechanism is based on a linear predictor that describes the relationships between the different classifiers. The predictor is premised on historical processed classifier match data and the resulting engagements. That is, whenever an impression is reported, the system records which classifiers were involved in the selection, and what user engagement resulted from that impression. The predictor is fed all the data for all past impressions and utilizes optimization logic, for example Stochastic Gradient Descent. The resulting score for each classifier pair (one from the content environment and one from the selected asset) describes how likely it is to result in an engagement. For example, the pair Pizza-Pizza may have a score of 0.003 whereas the pair Pizza-Fizzy Beverage may have a score of 0.005.

The system maintains one general predictor based on all the historical match data (non-identifying) available across the system, as well as dedicated predictors for different entities based on data from their own running campaigns. The entity's predictor dictionary can cater to specific behaviors that a certain circumstances or audiences may exhibit, which sometimes differ from the generic behavior across entities and content environments.

When a new entity is introduced to the system, its matching mechanism uses the general predictor until there is enough specific information to train a dedicated entity predictor. Predictor performance is not expected to be constant over time, due to shifting conditions and public interests and the introduction of new classifiers. Predictors are kept up to date by being retrained from their respective data pool when their average performance drops below a certain threshold, or when a certain number of unknown classifiers is encountered.

Some entities prefer to use Hierarchical Taxonomy Matching because it makes it easier see correlation between the content environment and selected assets. Still, a comparison between the two matching techniques shows that Engagement-based Matching improves the correlation between classifier scores and engagement rates, increasing the 'R-value' (a measure of correlation) by more than an order of magnitude.

Neural-Based Matching

As demonstrated above, Engagement-based Matching maximizes engagement rates by tapping into the correlation between classifier pairs and their contribution to the engagement rate. With each match of an asset to a media context, a multitude of classifier pairs are used to determine the match score. For example, if the aforementioned pineapple as a pizza topping page is matched to an Icelandic brand energy drink, a good match is to be expected because all of the classifier pairs have either a positive or a neutral effect on engagement rate. See FIG. 8.

Using a pair of classifiers as the field of view for determining engagement rates leads to a simple predictor implementation, minimizing memory utilization and maximizing performance. If the field of view is widened to include groups of classifiers and their effect on engagement, or even relationships between groups, then new patterns and relationships, that were not previously considered, may be uncovered. For example, a larger classifier group containing Pizza, Topping, Pineapple and Iceland may show to significantly reduce engagement rate based on user behavior, for valid reasons, where for instance pineapple as a pizza topping may be banned in Iceland, and demonstrates that this is in fact not a good match. The task of weighting the contribution of all the different classifier groups may be given to a machine learning algorithm. The mechanism is similar to the linear predictor, but instead, the predictor uses a Neural Network to expose non-linear relationships.

Decision-Making

Traditionally, exemplary use of an asset's targeting criteria of the subject disclosure is a set of conditions defining the circumstances which will allow the asset to be served in a campaign. For example, contextual matching, geotargeting, dayparting, priority weighting, impression goals, etc., are all conditions that the criteria evaluate and enforce, when deciding whether to serve one asset or another in a campaign, for example a digital marketing campaign. Aspects of the subject technology's emotive engine modular design harness the criteria's power to decide for other, non-campaign related uses.

Rule-Based Criteria

In an exemplary embodiment, the criteria pipeline is a filter, applying conditions to a set of items, deciding which items comply and can be passed on, and which are to be filtered. When used with a terminal weight condition, the criteria will select a maximum of n items from all the items that were not filtered out, based on their weight, where a higher weighted item is more likely to be selected. For example, a traditional asset's targeting criteria will have a terminal weight condition with n=1, that when enforced, results in the selection of a single asset. During the execution of the criteria pipeline, the conditions are executed sequentially on the items, where each condition contains a logic that is applied to the item based on properties of the item itself, properties that were defined for the whole criteria pipeline, or properties from a common context that is shared between all the condition enforcers. Aside from deciding if an item should be filtered, a criteria condition can also affect the weight of an item, therefore influencing final selection.

In some configurations, items destined to pass through the criteria, do not immediately have enough relevant properties populated to do so. In respect to cases where item properties need to be collected over time to satisfy a criterion, Diminishing Perspective can be used.

Diminishing Perspective

Figure 9:
FIG. 9 shows a pair of plots comparing received transmission to how the data is fed in accordance with a use case example.

Diminishing Perspective is a mechanism that creates a grounded perspective from many chunks of data, some related to each other while others are not. The perspective has a set of rules that govern how chunks are to be catalogued, grouped, sorted and merged into coherent and usable knowledge to be used for decision-making. As time progresses, some of data may become stale and outdated, therefore the perspective also maintains a timeline that affects the relevancy of the data stored. The perspective is kept fresh with new data as the old data's effect diminishes, hence, diminishing perspective. To better illustrate the purpose of the perspective, here are two examples:

An entity with several motorcycles participating in an endurance race, would like to know in real time, whenever one of the motorcycles' engine temperature has an upward trend. That way, the entity can communicate to the rider to ease off the throttle and maintain the longevity of the engine. The criteria rule in this case states that the temperature must be continuously rising across no fewer than eight data points. Each motorcycle is fitted with a telemetry unit that samples the temperature several times a second and transmits, every second, the recently measured temperatures with their measurement times. Due to the nature of the communications, it is possible for transmissions to arrive out of order, which necessitates collecting and organizing the information from each of the motorcycles until there is enough data to qualify the criteria. Referring to FIG. 9, the chart on the left shows how the transmissions are being received, with two of them (2 and 4) out of order. The chart on the right shows how data is fed to the criteria, after being treated in the perspective, with datapoints extracted from the transmissions, sorted and truncated to include only the relevant parts (vertical dotted line denotes where data is no longer relevant).

Figure 10:
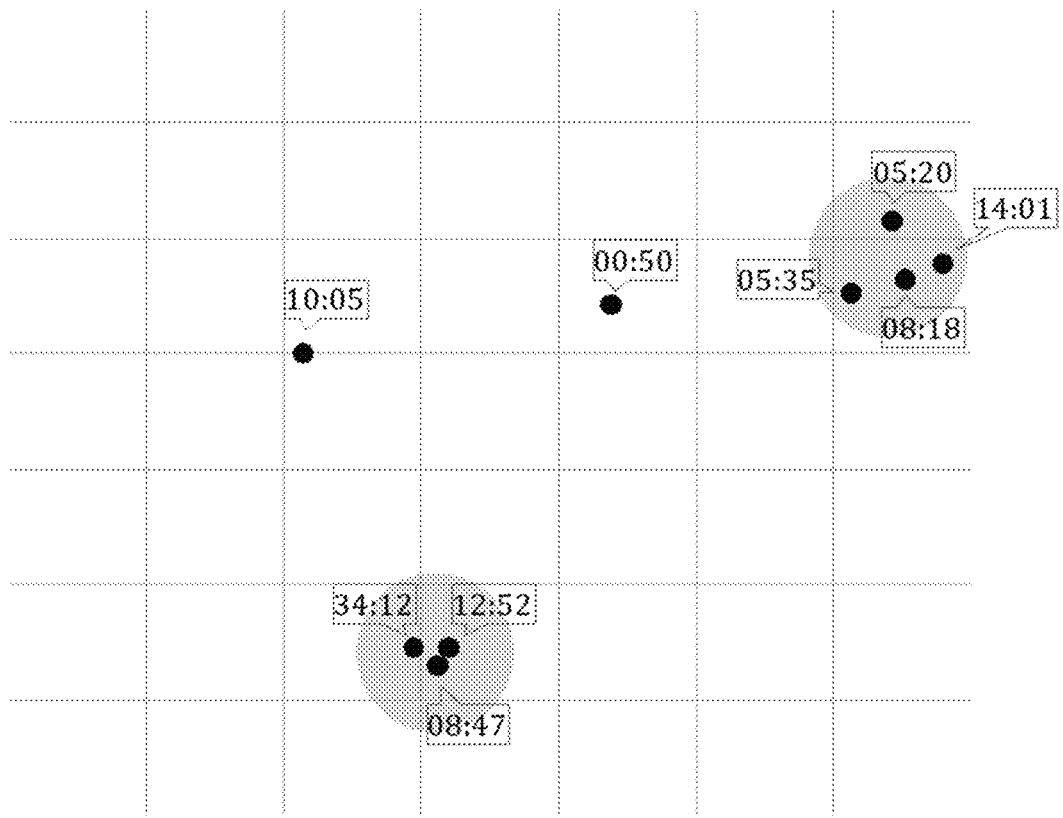
FIG. 10 is a plot charting group member locations in an example application in accordance with a use case example.

Another entity which organizes an off-road race, would like to know in real time, whenever several of the competitors have all stopped in close proximity to one another, which may indicate a boggy terrain, so that one of the organization's helicopters can be dispatched to assist. The criteria rule in this case is stated as more than 3 vehicles standing still within 500 meters of one another for more than 5 minutes. Each competing vehicle is fitted with a GPS unit that continuously transmits its coordinates to the organizers whenever it comes to a standstill. This means that the perspective must group the transmissions by position and measure the time each vehicle is transmitting before sending the information to the criteria. The perspective will use heuristics to determine the location for each of the stopped vehicle groups as each vehicle will have slightly different coordinates. FIG. 10 shows a plot of vehicle locations.

Whenever new information is received, the perspective updates the stored data, removes stale data, and sends all the relevant data to the criteria. Once an item passes the criteria, a predefined action is executed, which can be a call to an external endpoint, SMS alert, email notification, etc.

The subject technology emotive engine requires very little direction from the operator when it comes to targeting, and there is often no need to specify the subject of the asset, item, industry vertical, company or even the message, service or product showcased in a promotional message. Operators can manually add or remove classifiers from association with the asset or item for further refinement of the results. The targeting mechanism may be reconfigurable according to more traditional features, such as targeting to devices, browser types, platforms, operating systems, geolocation, etc. Overall, the emotive engine automates the tedious task of specifically targeting every asset to a specific content environment, page, channel or context. Instead, the most relevant assets and items are automatically targeted to each context to maximize engagement.

ASSET CLASSIFICATION EXAMPLES

Video Asset Classification Example

Figure 11:
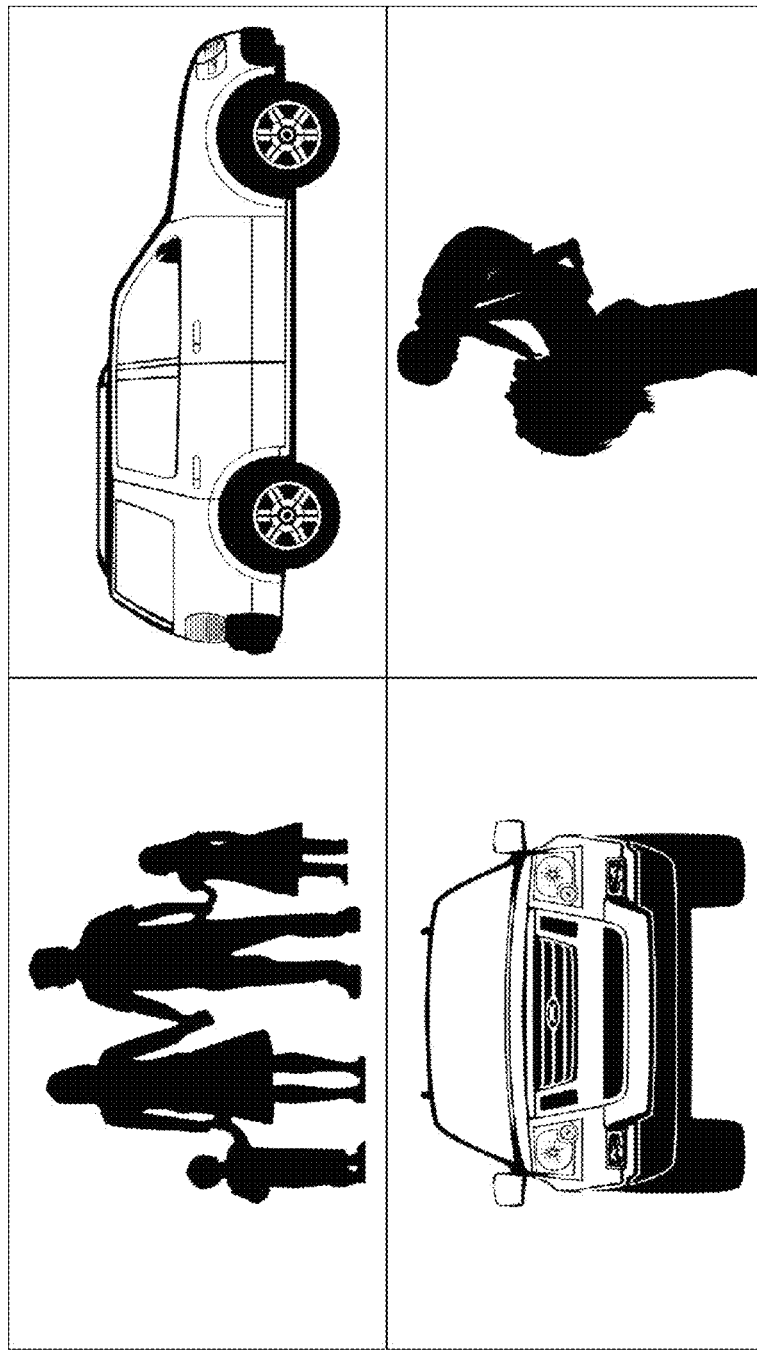
FIG. 11 is a diagrammatic view of a plurality of video frames extracted from a video stream analyzed for topics of interest to be correlated with promotional assets in accordance with embodiments.

Referring to FIG. 11, four frames from a video stream are extracted for analysis by the embodiments described herein. The system may derive various element information that may be used to match an asset to the content of the media analyzed. In the frames captured, the following example metadata is captured. While the example shows only four frames, it should be understood that samples may include many more frames, for example, tens or hundreds of frames.
Topics: cars, automotive, transportation, travel
Entities: vehicle, motor vehicle, sport utility vehicle, technology, parents, mom, family, experience
Logos: Manufacturer Co. Logo
People: Actor Jane Smith
Organizations: Manufacturer Motor Co.
Places: N/A
Feelings: positive sentiment, empathy, positive emotions, emotions

Display Asset Classification Example

Figure 12:
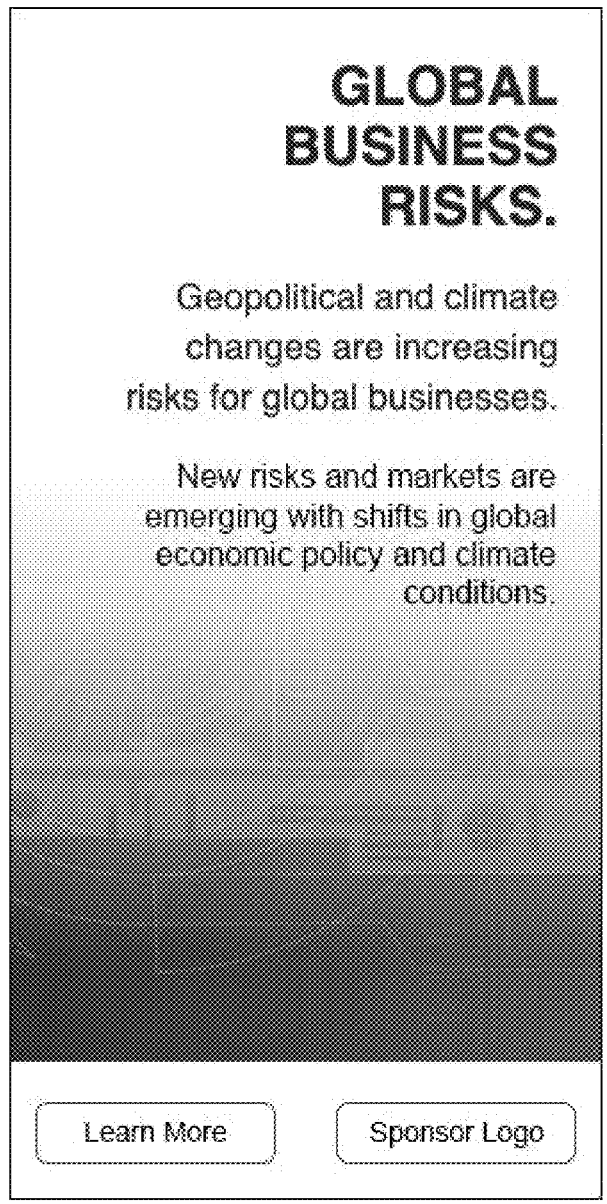
FIG. 12 is a screenshot of an image asset analyzed for topics of interest to be correlated with content in accordance with embodiments.
Figure 14:
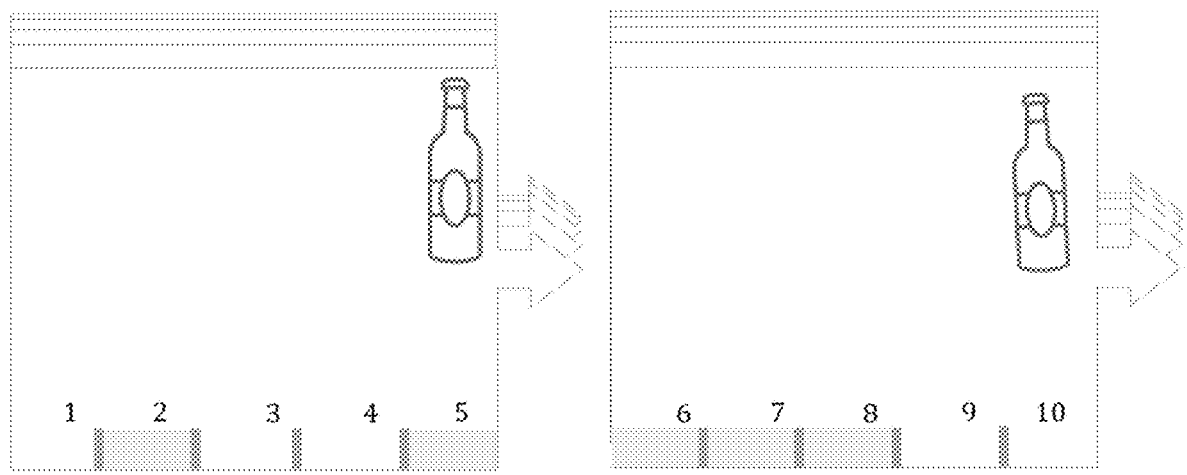
FIG. 14 is a diagrammatic view showing screen time of different objects in accordance with a use case example.

FIG. 14 shows an example of static text or imagery asset that may be analyzed for dynamic matching with a content environment. The system may extract the following example metadata:
Topics: business, trade, geopolitics
Entities: business, risk, resilience
Logos: Sponsor Logo
People: N/A
Organizations: N/A
Places: North America, Asia
Feelings: negative sentiment Display Content Selection and Optimization FIG. 12 represents the ability for an entity to automate with the system the selection of the most relevant promotional asset/service (for example, commercial risk insurance promotion vs. life insurance promotion for an insurance provider) displayed to a viewer based on relevancy to the real-time context of the media/article being viewed.

Podcast Audio Selection and Discovery

In another embodiment, an entity may automate the discovery of relevant podcast episodes, based on the real-time context of article content. An entire episode or micro-targeted segment of a specific episode, discussing for example, responsible investment, may be presented as related listening juxtaposed to content about environmental, social and corporate governance investments. The system transcribes the podcast for viewers to read or listen while in the content environment with the system's audio player, or subscribe from the user's device for example a smartphone to listen later on any major audio app/platform such as Apple Podcasts®.

Live Streaming Video Identification and RealTime Criteria Decision:

In another embodiment, real time brand detection in HTTP Live Streams (HLS) of multimedia directly detected by the system or through modular integration with third party computer vision algorithms or services, enables the subject technology to display an asset or item, whenever an object or identifying mark such as a logo appears during a multimedia stream, in the instance of a professional sports game whether on a backdrop billboard, on a player's uniform, on a fan's T-shirt, etc. The criteria can be tweaked to allow only objects or identifying marks such as logos of certain values or brands, sizes and duration on screen, so that only impactful appearances of the object or identifying marks will result in asset selection or promotion. In an example embodiment, an advertiser may choose to show an ad whenever their logo is seen on screen for at least 3 seconds with a minimum size of 5% of the viewport.

Another aspect of the subject technology offers combinational data, such as realtime statistics or data in a professional sports game, to corresponding realtime object detection. In one example, an advertiser may choose to only show an asset or promotional message when both the advertiser's logo was spotted with certain significance on screen during broadcast within 20 seconds of a certain game event, for example a change in score being displayed/broadcasted, or another event detected based on information retrieved from a data source, for example an all-time high career score achieved by a player. In another example, a commercial break may be dynamically recommended by the system to a media entity for commercial insertion, or directly triggered and inserted by the system, in detection of idle time during such sports game. The triggering of a commercial break may be determined by a certain set of rules or definitions such as calling a timeout. When the triggering event occurs, the most recent object detected, (for example, a certain logo of a brand), may be used to determine the promotions which appear during such break.

The subject technology emotive engine may aggregate and prioritize feeds or chunks of identifying objects such as logo position data that is recognized in a multimedia stream directly by the system, or third party systems such as computer vision services, to the Diminishing Perspective. Each chunk contains information about multiple identified objects or marks (such as logos) identified in the viewport. Each identified object contains a corresponding list of positions (x,y coordinates) denoting where it was identified, and each such position contains a list of time offsets, denoting at which times an object appeared in a specific location. The perspective uses heuristics to merge data from different chunks. For example, two logos that appear in two adjacent chunks, and represent the same brand with approximately the same position and size on screen, are considered one and the same. A certain leeway may be given to differences between objects from different chunks, to compensate for camera movement (approximate position) and camera zoom being applied (approximate size).

An exemplary embodiment may use three or more criteria conditions:

Percent of viewport: An object, for example, a logo must comply with a minimum and/or maximum size to pass this condition. Percentage is used as a unit of measurement because it eliminates the need to know the video stream's resolution, or the viewer's screen size or resolution.

Figure 13:
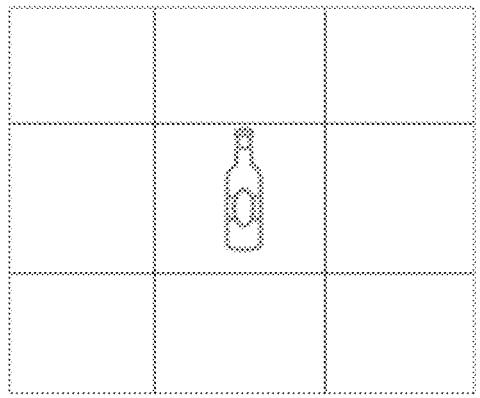
FIG. 13 is a plot showing detection of an object on display in accordance with a use case example.

Position in viewport: The object, for example, a logo, must appear in a predefined area on the screen. For example, an advertiser may choose to act only if their logo appears in the center of the viewport. The viewport may be divided into nine sections, and this condition allows multiple sections to be selected at once. FIG. 13 shows an example viewport diagram with an object in the center of the viewport. The location of the viewport may vary from screen to screen.

Time on screen: Referring to FIG. 14, the object for example, a logo, must be visible inside the viewport for a minimum amount of time in some embodiments. For example, in an exemplary use case an advertiser may set the process to act only if their logo appears on the screen for at least four seconds. This condition uses heuristics to gather the combined time that each logo appeared on the screen, by collecting time offsets from the different chunks relating to the same object. This is further complicated by the chunks arriving out of order, like in the aforementioned endurance race example. For example, two chunks (each containing multiple logo information) hold time offsets for a fizzy beverage appearing on screen. Because of similarity in the beverage's brand, position and size, it will be considered the same logo instance and the time offsets from the two chunks will be combined. The object will pass the criteria needed if the object stays on screen for at least 4 consecutive seconds.

Figure 15:
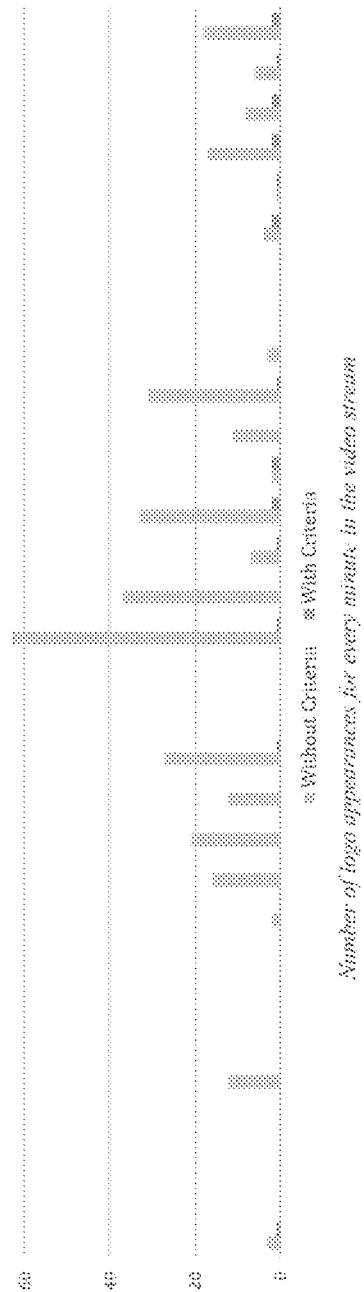
FIG. 15 is a plot charting appearances of a logo in a video stream in accordance with a use case example.

The effect of the criteria can be seen in FIG. 15 where appearances of an object (in this example, the display of a logo), in a 40-minute video stream are plotted, with and without applied criteria. By way of example, a brand logo may appear 400 times over the span of a video broadcast. Many appearances are likely to be bunched close together, with some appearing for a few hundredths of a second. Without criteria under the subject technology, for instance a minimum of 2 seconds on screen and a minimum size of 5% of viewport, the identified logo would trigger an appearance dozens of times every minute. With the criteria, only significant appearances (ones that are considered to be eventful that may draw the attention of a viewer) will result in actionable appearances, in some cases just 5% of detections.

From the foregoing it will be appreciated that, although specific embodiments of the invention have been described herein for purposes of illustration, various modifications may be made without deviating from the spirit and scope of the invention. For example, one skilled in the art will recognize that the methods and systems discussed herein are applicable to other areas and devices other than apps having ads dynamically incorporated, such as email, web browsers, newsreaders, online books, navigation devices, other multimedia devices and environments, voice based media, applications and devices, etc. In addition, different forms of content can be dynamically incorporated into multimedia targets, including, but not limited to, code, webpages, HTML, XML, RSS and other feeds, data such as social media content and other data sources, audio, video and static or animated text or graphics. One skilled in the art will also recognize that the methods and systems discussed herein are applicable to differing protocols and communication media (optical, wireless, cable, etc.) and that the techniques described herein may be embedded into such a system. In addition, those skilled in the art will understand how to make changes and modifications to the methods and systems described to meet their specific requirements or conditions.

The embodiments described above may include methods performed as computer program products. Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

In at least some exemplary embodiments, the exemplary disclosed system may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

While multiple embodiments are disclosed, still other embodiments of the present disclosure will become apparent to those skilled in the art from this detailed description. There may be aspects of this disclosure that may be practiced without the implementation of some features as they are described. It should be understood that some details have not been described in detail in order to not unnecessarily obscure the focus of the disclosure. The disclosure is capable of myriad modifications in various obvious aspects, all without departing from the spirit and scope of the present disclosure. Accordingly, the drawings and descriptions are to be regarded as illustrative rather than restrictive in nature.

The invention claimed is:

1. A method for dynamic correlation of assets with text or image based digital media, performed by a computer processor, comprising:

configuring a targeting mechanism to identify relevant content;

segmenting an audio/video stream into sections of the digital media;

extracting features from the digital media;

semantically-analyzing the extracted features for an understanding of characteristics associated with the respective features;

identifying topics for each section of the digital media from the extracted features;

automatically determining a respective first classifier to classify each section of the digital media into one or more identified topics;

automatically determining a respective second classifier to classify each of the assets into one or more topics;

determining a plurality of classifier groups using at least the respective first classifier and respective second classifier;

determining a general predictor and a dedicated predictor for the plurality of classifier groups with at least one of a hierarchical taxonomy matching, engagement-based matching, and neural-based matching, wherein the general predictor describes how likely each classifier group results in an engagement and is derived from historical processed classifier match data and the resulting engagements, wherein the dedicated predictor describes how likely each classifier group of a particular entity results in an engagement and is derived from specific behaviors that one or more circumstances or audiences exhibit;

selecting an asset using the general predictor and the dedicated predictor with at least one of the hierarchical taxonomy matching, the engagement-based matching, and the neural-based matching with the highest likelihood of resulting in a positive user reaction; and rendering the selected asset with the digital media.

2. The method of claim 1, wherein the digital media comprises a moving audio/video file.

3. The method of claim 2, further comprising:

identifying a current content from a section of the moving audio/video file, wherein the step of extracting features is from the section of the moving audio/video file; and the selected asset is inserted at a time during a pendency of play of the section of the moving audio/video file.

4. The method of claim 1, further comprising:

monitoring viewers and/or listeners for feedback reactions to content in the digital media;

analyzing the feedback for sentiments expressed by the viewers and/or listeners;

determining an overall sentiment value from the feedback; and correlating the asset based on the overall sentiment value of the content.

5. The method of claim 1, further comprising:

designating trigger event criteria;

operating a real time events listener to monitor for the event criteria; and triggering the correlation of the selected asset based on one of the event criteria being reached.

6. The method of claim 5, further comprising:

detecting a location of one of the extracted features within a viewport in a content environment of the digital media;

determining whether the location meets one of the trigger event criteria;

determining whether an on-screen time appearance of the extracted feature meets one of the trigger event criteria; and triggering the correlation of the selected asset based on the trigger event criteria being met.

7. The method of claim 1, further comprising:
designating insertion point times for the digital media; and triggering the correlation and rendering of the selected asset based on digital media reaching an insertion point time.

8. A method for dynamically correlating assets with digital media data, performed by a computer processor, comprising:

configuring a targeting mechanism to identify relevant content;

identifying an audio/video digital stream of information or data;

segmenting the audio/video digital stream into sections of the digital media data;

extracting features from respective sections of the digital media data;

identifying topics for each section of the digital media data from the extracted features;

automatically determining a respective first classifier to classify each section of the digital media data into one or more identified topics;

automatically determining a respective second classifier to classify each of the assets into one or more topics;

determining a plurality of classifier groups using at least the respective first classifier and respective second classifier;

determining a general predictor and a dedicated predictor for the plurality of classifier groups with at least one of a hierarchical taxonomy matching, engagement-based matching, and neural-based matching, wherein the general predictor describes how likely each classifier group results in an engagement and is derived from historical processed classifier match data and the resulting engagements, wherein the dedicated predictor describes how likely each classifier group of a particular entity results in an engagement and is derived from specific behaviors that one or more circumstances or audiences exhibit;

selecting an asset using the general predictor and the dedicated predictor with at least one of the hierarchical taxonomy matching, the engagement-based matching, and the neural-based matching with the highest likelihood of resulting in a positive user reaction; and rendering the selected asset with the respective sections of the digital media data.

9. The method of claim 8, further comprising:
identifying a current content from a section of the moving audio/video file, wherein the step of extracting features is from the section of the moving audio/video file; and
the selected asset is inserted at a time during a pendency of play of the section of the moving audio/video file.

10. The method of claim 8, further comprising rendering the selected asset in a nonlinear format during a playing of the digital media data.

11. The method of claim 8, further comprising:
designating trigger event criteria;
operating a real time events listener to monitor for the event criteria; and
triggering the correlation of the selected asset based on one of the event criteria being reached.

12. The method of claim 11, wherein the event criteria is based on a minimum screen time of an object on display in the digital media data.

13. The method of claim 8, further comprising:
designating insertion point times for the digital media data; and
triggering the correlation and rendering of the selected asset based on the digital media data reaching an insertion point time.

14. The method of claim 8, further comprising:
recording user reactions to different assets and digital media data combinations over time.

15. The method of claim 14, further comprising using lemmatization to analyze the feedback for sentiment.

16. A non-transitory computer readable medium encoded with computer executable instructions that when executed by the computer result in dynamic correlation of assets with digital media comprising:

one or more computer readable storage media, and instructions collectively stored on the one or more computer readable storage media, the instructions comprising:

configuring a targeting mechanism to identify relevant content;

segmenting an audio/video stream into sections of the digital media;

extracting features from the segmented sections of the digital media;

semantically analyzing the extracted features for an understanding of characteristics associated with the respective features;

extracting topics from the digital media based on the characteristics;

identifying topics for each section of the digital media from the extracted features;

automatically determining a respective first classifier to classify each section of the digital media into one or more identified topics;

automatically determining a respective second classifier to classify each of the assets into one or more topics;

determining a plurality of classifier groups using at least the respective first classifier and respective second classifier;

determining a general predictor and a dedicated predictor for the plurality of classifier groups with at least one of a hierarchical taxonomy matching, engagement-based matching, and neural-based matching, wherein the general predictor describes how likely each classifier group results in an engagement and is derived from historical processed classifier match data and the resulting engagements, wherein the dedicated predictor describes how likely each classifier group of a particular entity results in an engagement and is derived from specific behaviors that one or more circumstances or audiences exhibit;

selecting an asset using the general predictor and the dedicated predictor with at least one of the hierarchical taxonomy matching, the engagement-based matching, and the neural-based matching with the highest likelihood of resulting in a positive user reaction; and rendering the selected asset with the digital media.

17. The non-transitory computer readable medium encoded with computer executable instructions of claim 16, wherein:

the digital media comprises a multimedia stream, and the program instructions further comprise:
identifying a current content from a section of the multimedia stream, wherein the step of extracting features is from the section of the multimedia stream; and
the selected asset is inserted at a time during a pendency of play of the section of the multimedia stream.

18. The non-transitory computer readable medium encoded with computer executable instructions of claim 16, wherein the instructions further comprise:
designating trigger event criteria;
operating a real time events listener to monitor for the event criteria; and
triggering the correlation of the selected asset based on one of the event criteria being reached.

19. The non-transitory computer readable medium encoded with computer executable instructions of claim 16, wherein the instructions further comprise:

designating insertion point times for the digital media; and
triggering the correlation and rendering of the selected asset based on the digital media reaching an insertion point time.

20. The non-transitory computer readable medium encoded with computer executable instructions of claim 16, wherein the program instructions further comprise:
monitoring viewers and/or listeners for feedback reactions to content in the digital media;
analyzing the feedback for sentiments expressed by the viewers and/or listeners;
determining an overall sentiment value from the feedback; and
selecting the asset based on the overall sentiment value of the content.

* * * * *